US012428279B2

(12) United States Patent
Gale et al.

(10) Patent No.: US 12,428,279 B2
(45) Date of Patent: Sep. 30, 2025

(54) ANTI-ENTRAPMENT DEVICE FOR SCISSOR LIFTS

(71) Applicant: BLUESKY SOLUTIONS LIMITED, Lutterworth (GB)

(72) Inventors: Kevin Jonathan Gale, Marlow (GB); Leslie Darby, Maghull (GB); Christopher Houlton, St. Helens (GB); Matthew Ross, Southampton (GB)

(73) Assignee: NATIONWIDE PLATFORMS LIMITED (GB)

( * ) Notice: Subject to any disclaimer, the term of this patent is extended or adjusted under 35 U.S.C. 154(b) by 1044 days.

(21) Appl. No.: 17/341,611

(22) Filed: Jun. 8, 2021

(65) Prior Publication Data

US 2021/0292148 A1 Sep. 23, 2021

Related U.S. Application Data

(63) Continuation of application No. 15/685,764, filed on Aug. 24, 2017, now abandoned.

(51) Int. Cl.
*B66F 17/00* (2006.01)
*B66F 11/04* (2006.01)
(Continued)

(52) U.S. Cl.
CPC ............ *B66F 17/006* (2013.01); *B66F 11/04* (2013.01); *B66F 11/042* (2013.01); *B66C 15/06* (2013.01); *B66F 9/24* (2013.01)

(58) Field of Classification Search
CPC ........ B66F 17/00; B66F 17/006; B66F 11/00; B66F 11/046; B66F 11/04; B66F 11/042;
(Continued)

(56) References Cited

U.S. PATENT DOCUMENTS 2,815,250 A * 12/1957 Thornton-Trump ......................... B66F 11/044 182/112
4,390,812 A * 6/1983 Seidler .................. H05B 39/09 340/331

(Continued)

FOREIGN PATENT DOCUMENTS

| | | |
|---|---|---|
| EP | 1 026 120 | 8/2000 |
| GB | 2 530 780 | 4/2016 |

*Primary Examiner* — Colleen M Chavchavadze
*Assistant Examiner* — Shiref M Mekhaeil
(74) *Attorney, Agent, or Firm* — Foley & Lardner LLP

(57) ABSTRACT

The present invention provides an anti-entrapment device for an aerial lift having a basket or cage. The anti-entrapment device comprises an elongate housing; two or more sensors housed within said elongate housing and a switch activation device coupled to the elongate housing. At least one of said two or more sensors is positioned proximate an end of said elongate housing. Said switch activation device is arranged at an angle to the orientation of said sensor(s) positioned proximate the end of said elongate housing. The sensors are arranged to provide a detection zone and to detect obstacles within the detection zone. The sensors are configured to facilitate the alerting of an operator standing in a basket or cage to the presence of an obstacle that may potentially strike the operator before the strike occurs, and the switch activation device is configured to prevent further movement of the basket or cage once the switch activation device is activated.

26 Claims, 10 Drawing Sheets

(51) Int. Cl.
*B66C 15/06* (2006.01)
*B66F 9/24* (2006.01)

(58) Field of Classification Search
CPC .... B66F 9/20; B66F 9/24; B66F 9/063; B66C 15/06
See application file for complete search history.

(56) References Cited

U.S. PATENT DOCUMENTS

| | | | | | |
|---|---|---|---|---|---|
| 4,456,093 | A * | 6/1984 | Finley | B66F 11/046 | 182/2.11 |
| 4,979,588 | A * | 12/1990 | Pike | B66F 17/006 | 182/2.11 |
| 5,021,917 | A * | 6/1991 | Pike | B66F 11/046 | 182/2.11 |
| 5,044,472 | A * | 9/1991 | Dammeyer | B66F 9/07545 | 414/630 |
| 5,687,081 | A * | 11/1997 | Wellman | G06F 8/65 | 701/1 |
| 5,992,562 | A * | 11/1999 | Boeckman | B66F 11/042 | 182/69.5 |
| 6,140,934 | A * | 10/2000 | Lam | B60Q 1/5035 | 362/388 |
| 6,405,114 | B1 | 6/2002 | Priestley et al. | | |
| 6,595,330 | B1 | 7/2003 | Henrickson et al. | | |
| 7,194,358 | B2 * | 3/2007 | Callaghan | B66F 17/006 | 340/436 |
| 9,090,432 | B2 * | 7/2015 | Zuckerman | B66F 9/20 | |
| 9,193,573 | B1 * | 11/2015 | Troy | B66F 7/065 | |
| 9,415,986 | B2 * | 8/2016 | Cummings | B66F 17/006 | |
| 9,676,602 | B2 * | 6/2017 | Cummings | B66F 11/046 | |
| 9,679,461 | B2 * | 6/2017 | Cummings | B66F 17/006 | |
| 10,029,899 | B2 * | 7/2018 | Hao | B66F 11/04 | |
| 10,124,999 | B2 * | 11/2018 | Puszkiewicz | B66F 17/006 | |
| 2003/0174064 | A1 | 9/2003 | Igarashi et al. | | |
| 2005/0187712 | A1 * | 8/2005 | Callaghan | B66B 5/0031 | 701/301 |
| 2005/0256608 | A1 * | 11/2005 | King | B66C 13/46 | 700/213 |
| 2005/0275522 | A1 * | 12/2005 | Nitz | B60Q 1/52 | 340/471 |
| 2006/0231302 | A1 * | 10/2006 | Rose | B62D 5/00 | 180/19.3 |
| 2007/0084450 | A1 | 4/2007 | Oka et al. | | |
| 2009/0126482 | A1 * | 5/2009 | Fundak | B63C 11/02 | 340/612 |
| 2009/0260920 | A1 * | 10/2009 | Cummings | B66F 17/006 | 182/2.1 |
| 2010/0133043 | A1 * | 6/2010 | Black | B66F 11/044 | 182/148 |
| 2012/0078471 | A1 * | 3/2012 | Siefring | B66F 9/0755 | 701/41 |
| 2012/0126000 | A1 * | 5/2012 | Kunzig | G06T 7/73 | 235/385 |
| 2012/0160604 | A1 * | 6/2012 | Bowden | B66F 11/046 | 182/19 |
| 2013/0153333 | A1 * | 6/2013 | Richards | B66F 11/044 | 182/113 |
| 2013/0233645 | A1 * | 9/2013 | Hao | B66F 17/006 | 182/19 |
| 2013/0313040 | A1 * | 11/2013 | Cummings | B66F 11/046 | 182/19 |
| 2014/0021912 | A1 * | 1/2014 | Martin | B60L 53/124 | 320/109 |
| 2014/0043780 | A1 * | 2/2014 | Tsai | H02J 7/0042 | 361/752 |
| 2015/0008073 | A1 * | 1/2015 | Cummings | B66F 11/04 | 182/148 |
| 2015/0217981 | A1 * | 8/2015 | Baillargeon | B66F 17/006 | 182/2.8 |
| 2015/0268725 | A1 * | 9/2015 | Levesque | G06F 3/041 | 345/156 |
| 2015/0368082 | A1 * | 12/2015 | Davis | B66F 11/042 | 701/50 |
| 2016/0075543 | A1 * | 3/2016 | Lombardo | B66F 11/044 | 187/247 |
| 2016/0098910 | A1 * | 4/2016 | Cummings | G08B 21/02 | 340/540 |
| 2016/0099122 | A1 * | 4/2016 | Cummings | B66F 17/006 | 200/5 R |
| 2016/0137471 | A1 * | 5/2016 | Dittus | B66F 17/006 | 182/18 |
| 2016/0221812 | A1 * | 8/2016 | Puszkiewicz | B66F 11/044 | |
| 2016/0306114 | A1 * | 10/2016 | Kashyap | G02B 6/1345 | |
| 2016/0332856 | A1 * | 11/2016 | Steedley | B66F 17/006 | |
| 2017/0153694 | A1 * | 6/2017 | Baldwin | G06F 1/3212 | |
| 2017/0233232 | A1 * | 8/2017 | Davis | B66F 11/042 | 182/69.5 |
| 2018/0089616 | A1 * | 3/2018 | Jacobus | G05D 1/0274 | |
| 2018/0105408 | A1 * | 4/2018 | Chomko | B66F 17/006 | |
| 2019/0272729 | A1 * | 9/2019 | Staninger | B60N 2/0029 | |

* cited by examiner

ANTI-ENTRAPMENT DEVICE FOR SCISSOR LIFTS

CROSS-REFERENCE TO RELATED PATENT APPLICATIONS

The present application is a continuation of U.S. patent application Ser. No. 15/685,764, filed Aug. 24, 2017, which claims priority to United Kingdom Patent Application No. GB1614519.5, filed Aug. 25, 2016, the contents of which are incorporated herein by reference in their entireties.

FIELD OF THE INVENTION

The present invention relates to an anti-entrapment device for scissor lifts. The present invention also relates a basket or cage having such an anti-entrapment device, and a scissor lift comprising the same.

BACKGROUND OF THE INVENTION

Aerial lifts are frequently employed for lifting operatives to elevated working sites, for example to install overhead pipe work during building construction. A typical aerial lift may comprise a mobile elevated work platform (MEWP) having an extendable boom which has an elevator basket or cage for housing operatives securely to the end of the boom. Alternative aerial lifts may comprise a MEWP having an extendable scissor linkage which has an elevator basket or cage for housing operatives securely to the end of the scissor linkage.

The basket or cage generally contains a control panel which permits an operative standing in the basket or cage to manoeuvre the work platform as desired. The aerial lift may be powered using hydraulics powered by the MEWP's engine.

The control panel generally features an emergency stop switch and a function enable switch which needs to be operated before the controls can be operated. In boom lifts the function enable switch is typically a footswitch which must be depressed to activate the controls. In scissor lifts the function enable is typically a dead man's handle. If the function enable switch is released, the basket or cage is prevented from moving immediately, but the MEWP's engine (which powers the hydraulics) continues to run. If the emergency stop switch is activated then both the basket is prevented from moving and, in most cases, the MEWP's engine is stopped.

Unfortunately it is known that operators standing at the control panel of the aerial lift can become trapped between the basket/cage and an obstacle before they can either release the function enable switch or activate the emergency stop. This is known as an entrapment event. Accidents of this nature can be fatal since the operator can be crushed.

The present applicants have previously described a safety device comprising a tensioned cord or wire (EP2096078B1) and an improved system comprising a pressure sensitive safety edge (WO2012/001353). Activation of the safety device, which is located proximate to the control panel, prevents movement of the basket or cage by overriding the function enable switch. The effect being equivalent to the operative having released the function enable switch. A further improvement was disclosed in WO2013/093395 whereby the safety device is not "live" until the operator activates the function enable switch.

The basket/cage of scissor lifts has more limited movement than that of boom lifts, limited to up and down movement. As a result, the issue of the possible entrapment of an operator in a scissor lift and how to prevent such an event from occurring is generally overlooked.

The present inventors have identified that it is preferable to prevent an entrapment even before it occurs rather than after it happens. Therefore it is an objective of the present disclosure to provide an anti-entrapment device that can alert an operator to possibility of an entrapment event occurring as well as prevent crushing of the operator in the event that entrapment occurs.

SUMMARY OF THE INVENTION

According to a first aspect, there is provided an anti-entrapment device for an aerial lift having a basket or cage, the anti-entrapment device comprising: an elongate housing; two or more sensors housed within said elongate housing, at least one of said two or more sensors positioned proximate an end of said elongate housing; a switch activation device coupled to the elongate housing, said switch activation device arranged at an angle to the orientation of said sensor(s) positioned proximate the end of said elongate housing; wherein the sensors are arranged to provide a detection zone and to detect obstacles within the detection zone; the sensors configured to facilitate the alerting of an operator standing in a basket or cage to the presence of an obstacle that may potentially strike the operator before the strike occurs, and the switch activation device configured to prevent further movement of the basket or cage once the switch activation device is activated.

The anti-entrapment device in accordance with the invention provides a device that can alert an operator to possibility of an entrapment event occurring, thus allowing the operator to take evasive action as appropriate, as well as one which prevents crushing of an operator in the event that entrapment of the operator occurs.

In scissor lifts, it is known for operators to accidentally engage the wrong control function, for example engage the lift function of the basket or cage rather than the drive function of the scissor lift. Such an error can lead to an accident, such as an obstacle striking the operator. This could especially be serious when the operator is looking or leaning over the side of the basket/cage while trying to drive the scissor lift. The possibility of an operator being crushed due to a mistake caused by engaging the wrong control function is eliminated by the anti-entrapment device of the invention as it first alerts the operator to the presence of obstacles that may potentially strike the operator, as such s/he is more aware of the risks in his environment. Secondly, should the lift function be accidently engaged rather than the drive function causing an obstacle to strike the operator, entrapment of the operator would result in activation of the switch activation device which results in the cessation of the basket or cage thereby preventing crushing of the operator.

Preferably, the anti-entrapment device includes two sensors, each sensor located proximate an end of the elongate housing. The elongate housing is preferably between 50 cm and 100 cm in length. In exemplary embodiments, the elongate housing is between 60 cm and 80 cm in length.

Preferably, the anti-entrapment device further comprises a plurality of braces configured to support the elongate housing in a position above and parallel to a top rail of a basket or cage.

Preferably, the switch activation device comprises a pressure sensitive safety edge.

Preferably, the anti-entrapment device further comprises an operator warning system. The operator warning system may comprises one or more warning lights mounted on the elongate housing.

Preferably, the sensors are ultrasonic sensors.

According to a second aspect there is provided a basket or cage for a scissor lift, said basket or cage comprising: an anti-entrapment device according to the first aspect; controls which permit an operator standing in the basket or cage to manoeuvre it, the controls comprising: an emergency switch which normally allows the flow of electricity and is operable to stop electrical supply and prevent movement of the basket or cage, and a function enable switch which is normally open to cut electrical supply and prevent movement of the basket or cage and which must be held closed by the operator to allow the flow of electricity and enable the operator to operate the controls; an alarm which is either audible, visual or audible and visual; a primary relay connected to the function enable switch; a secondary relay connected to the emergency switch; the primary and secondary relays being controlled by a programmable control module connected to the switch activation device, function enable switch and alarm;

wherein the control module is programmed to prevent movement of the basket or cage by cutting electrical supply to the function enable switch when the function enable switch is closed and the switch activation device is activated, and activate the alarm.

Preferably, the control module is further programmed to prevent movement of the basket or cage and activate the alarm by operating the emergency switch to cut the electrical supply, if the electrical supply to the function enable switch cannot be cut.

Preferably, the function enable switch is a dead man's handle.

Preferably, the alarm is located on an underside of the elongate housing of the anti-entrapment device.

In embodiments wherein the basket or cage forms part of a scissor lift and the scissor lift has a horn, the alarm may be an audible alarm which utilises the horn.

Preferably the horn sounds a unique sounding pattern.

The alarm may be linked to the horn via a serial communications link such as an RS232 connection.

In exemplary embodiments, the alarm is visual and flashes for a period of time when the switch activation device is activated.

Preferably, the control module is further programmed to perform a self-diagnostic test when the anti-entrapment device is first turned on, and if the anti-entrapment device fails the diagnostic test the control module is programmed to activate a fault warning system.

In exemplary embodiments, the basket or cage further comprises a switch activation device reset switch connected to the control module. Preferably, the reset switch is located on said controls.

The control module may be further programmed to delay activation of the cutting electrical supply to the function enable switch upon activation of the switch activation device. The delay may be for any suitable period of time, preferably the delay is approximately 0.4 seconds.

The basket or cage may further comprise an information link to a data collection device.

Preferably, additional modules can be plugged into the control module.

Preferably, the basket or cage has a scissor lift control box and the control module is housed within the scissor lift control box.

In exemplary embodiments, the basket or cage comprises two or more anti-entrapments devices according to the first aspect. The anti-entrapment devices are preferably positioned and connected in series with one another.

The or each anti-entrapment device may be removably attached to the basket or cage. Alternatively, the or each anti-entrapment device may be permanently attached to the basket or cage.

It would be understood that in embodiments wherein the basket/cage comprises a plurality of anti-entrapment devices, the plurality of anti-entrapment devices could include a combination of removably attached and permanently attached anti-entrapment devices.

Advantageously, each anti-entrapment device is located such that said elongate housing does not protrude either into or out of the basket or cage.

Preferably, the detection zone extends approximately 210 cm above the floor of the basket or cage.

Preferably, the sensors do not detect the position of the operator inside the basket or cage.

In embodiments comprising a control box, the control box may comprise a control panel having one or more warning lights mounted on the control panel.

Preferably, the basket or cage is a scissor lift basket or cage.

According to a third aspect, there is provided a scissor lift comprising a basket or cage according to the second aspect.

According to a fourth aspect, there is provided a method of preventing the crushing of an operator standing in a basket or cage of an aerial lift by an obstacle striking said operator, said method comprising the steps:

- installing a plurality of sensors to the basket or cage to establish a detection zone;
- installing a switch activation device proximate a control box of said aerial lift;
- connecting the sensors and the switch activation device to a control module capable of preventing movement of the basket or cage and/or alerting the operator to the presence of an obstacle;
- monitoring the detection zone for an obstacle entering the detection zone,
- sending a signal from the sensors to the control module to instruct the control module to alert the operator and/or to prevent movement of the basket or cage when an obstacle is detected within the detection zone;
- preventing movement of the basket or cage on activation of the switch activation device.

Preferably, when the sensors detect an obstacle and the control module activates an alarm and/or warning system, the operator can override the alarm and/or warning system by activating an override procedure.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

FIG. 1

Figure 1:
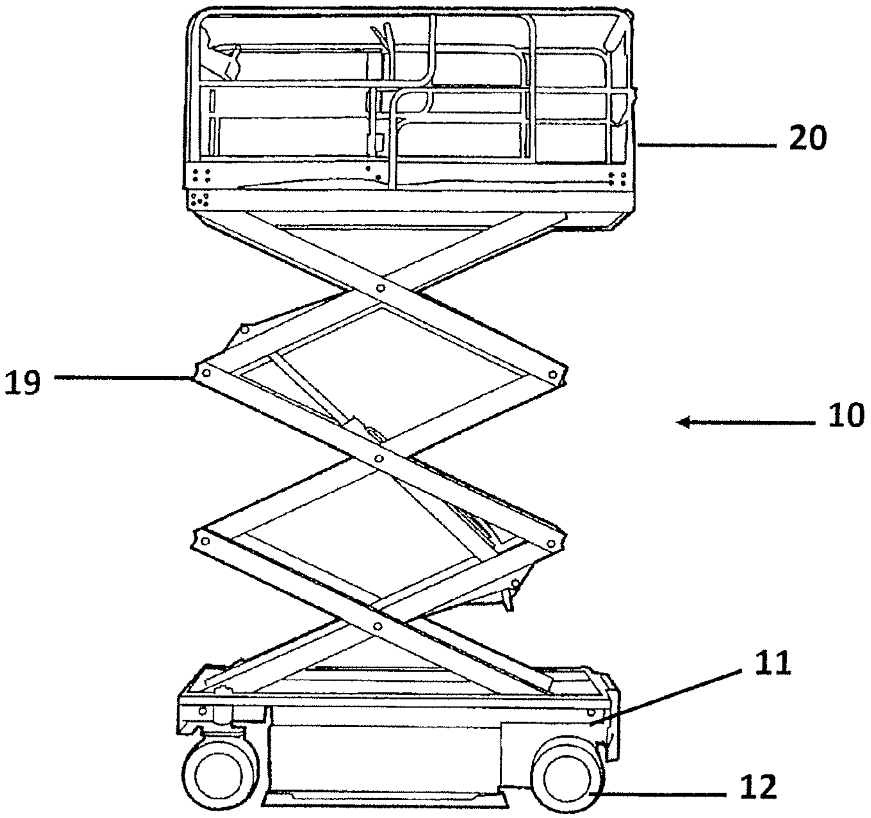
FIG. 1 shows a MEWP with a scissor lift.

With reference to FIG. 1, there is shown a mobile elevated work platform (MEWP) 10 in the form of a scissor lift. The MEWP 10 has a drivable vehicle body 11 having wheels 12 and an extendable scissor linkage 19. A basket or cage 20 is mounted on the free end of the scissor linkage 19 and the basket/cage 20, in use, can be raised or lowered relative to the ground as is well known. The basket/cage 20 is shown in a raised condition. The scissor lift is raised and lowered by any suitable means, typically operated by a powered hydraulic system provided on the vehicle body 11 and powered by the vehicle engine.

FIG. 2

Figure 2:
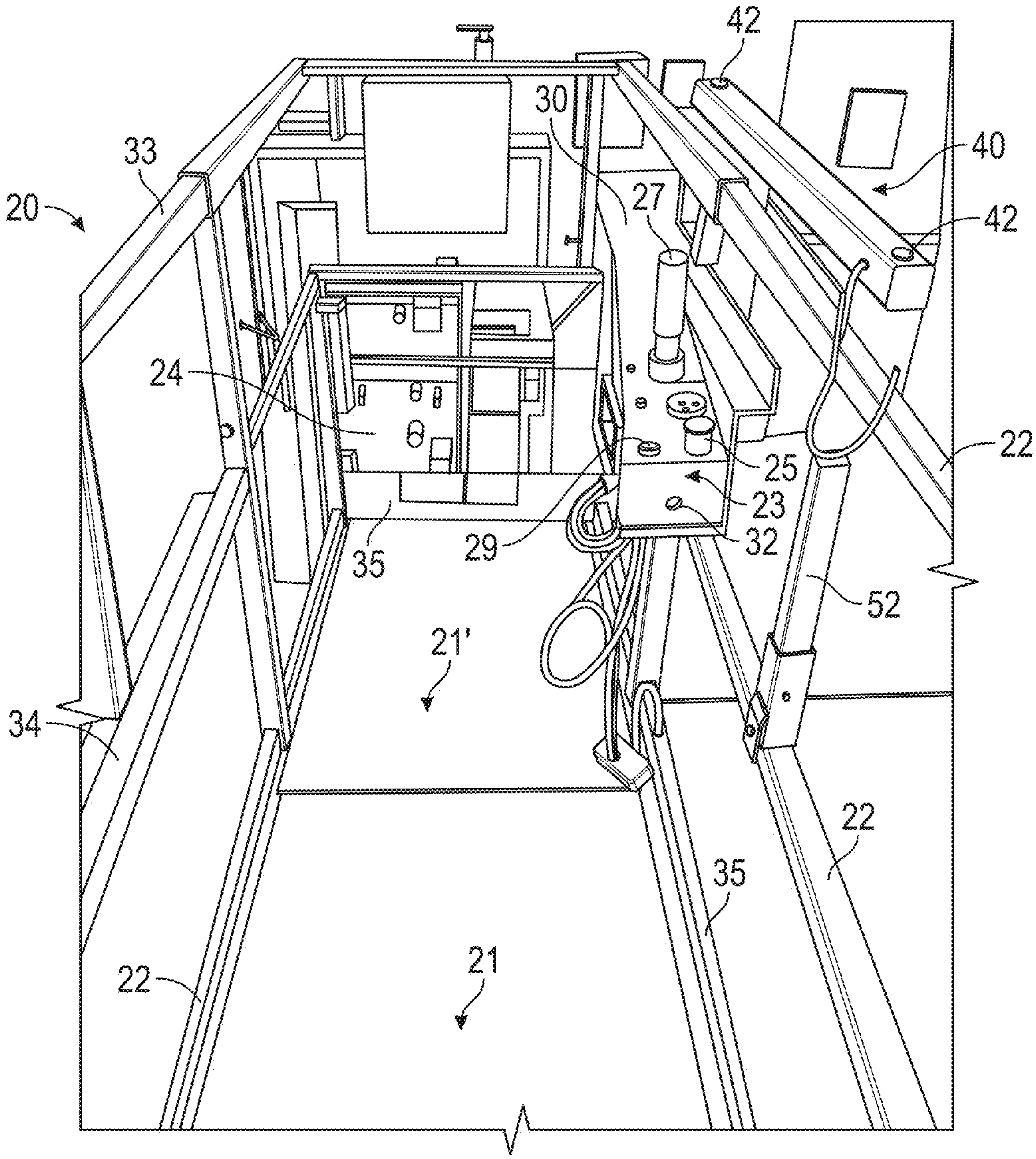
FIG. 2 shows a partial view of an embodiment of a basket/cage of a scissor lift in accordance with the invention.

With reference to FIG. 2 there is shown an embodiment of basket/cage 20 for a scissor lift in accordance with the invention. The basket/cage has a floor 21,21' which is surrounded by a safety barrier 22. In the embodiment shown, the floor 21,21' is extendable, although it may be understood that the floor of the basket/cage may be of a fixed length.

The basket/cage is of a typically standard size known in the art. There are two rails (a top rail 33 and a mid rail 34) and a kick plate 35 surrounding the perimeter of the basket/cage 20, all of which define the safety barrier 22. The top rail 33 is typically approximately 110 cm above the floor 21,21' of the basket/cage, such as approximately 102 cm from the floor 21,21' to the underside of the top rail 33. The mid rail 34 is typically positioned approximately 500 mm below the top rail 33, such as 566 mm from the underside of the top rail 33 to the top side of the mid rail 34.

The basket/cage 20 is provided with controls 23, shown as a control panel 24, which typically feature a control lever 27 whereby an operator (not shown) standing in the basket/cage 20 can manoeuvre the scissor lift to a desired location by engaging the drive function and/or raise or lower the basket/cage 20. The controls 23 also comprise a function enable switch in the form of a dead man's handle (not shown) which must be closed (depressed) by the operator before the controls 23 are operational. The dead man's handle may be coupled to the control lever 27 as known in the art. When the dead man's handle is not depressed movement of the basket/cage 20 ceases immediately although the MEWP's engine (which powers the basket) usually continues to run.

An emergency stop switch 25 is shown on the controls 23 which also ceases movement of the basket/cage 20 when activated. For most models of MEWP, the emergency stop switch 25 simultaneously shuts down the MEWP's engine.

In the embodiment shown, the control panel 24 is partially protected by a side plate 30. The electronics of the controls 23 are typically housed directly beneath the control panel 24 in a control box 32. The control panel may comprise one or more warning lights mounted thereon.

The basket/cage 20 further comprises an anti-entrapment device 40 and an alarm (not shown in FIG. 2).

An anti-entrapment device is a device to prevent entrapment events which potentially endanger the operator. The anti-entrapment device is not an anti-collision device. That is, the device is not designed to prevent collision of the basket/cage with surrounding obstacles.

The anti-entrapment device 40 comprises two or more sensors 42 arranged to provide a detection zone, and a switch activation device 43. The switch activation device 43 is configured to prevent further movement of the basket/cage 20 once the switch activation device 43 is activated. The anti-entrapment device 40 is described in more detail later on. In certain arrangements, the anti-entrapment device is only functional after the function enable switch is initially activated in order to make the controls operational.

The alarm may be either audible, visual or audible and visual.

A primary relay is connected to the function enable switch and a secondary rely is connected to the emergency switch 25. The primary and secondary relays are controlled by a programmable control module connected to the switch activation device, function enable switch, and alarm.

An advantage of the programmable control module is that it can be expanded to incorporate additional "modules" such as additional safety monitoring devices, a data recording device etc.

Advantageously, the control module is dimensioned such that it can also be housed within the control box 32. This is a significant improvement over the prior art which had a control module be housed outside of the control box, therefore taking up more space within the basket.

In addition, having dimensions to fit inside the control box means that the control module is smaller and lighter than in the prior art, this is important particularly because aerial lifts have a maximum load that can be lifted. A further advantage of housing the control module within the control box is that it cannot be accessed and tampered with as easily as in the prior art.

The control module is programmed to prevent movement of the basket/cage 20 by cutting communication between the function enable switch and the controls 23 when the function enable switch is closed and the switch activation device 43 of the anti-entrapment device 40 is activated. For example, the control module may be programmed to cut electrical supply to the function enable switch when the switch activation device 43 is activated.

Cutting communication between the dead man's handle (function enable switch) and the controls 23 means that the controls 23 would consider the dead man's handle not to be closed even though the dead man's handle is depressed.

The initiation of the cutting of communication between the function enable switch and the controls 23 or of electrical supply to the function enable switch may be delayed by the control module upon activation of the switch activation device 43.

Advantageously, employing a delay means that the sensitivity of the switch activation device 43 can be fine tuned to reduce the number of accidental activations. By employing a delay it is possible to accidentally activate the switch activation device 43 and remove the activating signal quickly enough that the control module does not consider the switch activation device 43 to have been activated. For example, the operator can brush against the switch activation device without cutting power to the controls. A delay may be up to approximately 0.5 seconds such as 0.1, 0.2, 0.3, 0.4 seconds, for example 0.4 seconds.

In a preferred configuration, the delay is approximately 0.4 seconds.

The control module is further programmed to prevent movement of the basket/cage 20 by operating the emergency switch 25 to cut electrical supply to the controls in the event that the communication between the function enable switch and the controls 23 cannot be cut.

The control module may also be programmed to activate the alarm at the same time or soon after cutting communication between the function enable switch and the controls 23 or electrical supply to the function enable switch.

The basket/cage 20 further comprises a switch activation device reset switch or button 29 connected to the control module. In the embodiment shown, the reset switch/button 29 is located on the controls 23. It would be understood that the reset switch/button may be positioned in a different location in the basket/cage, preferably proximate to the controls 23.

Typically the reset switch/button 29 must be activated within 10 seconds of the accidental activation, for example within 1, 2, 3, 4, 5, 6, 7, 8 or 9 seconds. This period is known as the pre-emergency stage.

The prevention of movement of the basket/cage 20 by the control module may be overridden in the pre-emergency stage.

In general the reset switch/button 29 can be deployed during an initial "pre-emergency" stage following activation of the safety activation device 43. The pre-emergency stage is typically a period of up to 10 seconds.

If the reset switch/button 29 is not deployed the full alarm is activated and movement is prevented.

The alarm then operates until the anti-entrapment device is reset.

In a preferred configuration during the pre-emergency stage, the alarm has a different warning pattern.

In one arrangement, during the pre-emergency stage the alarm's warning pattern comprises up to 5 sounds, flashes or sounds and flashes in ten seconds, such as 1, 2, 3 or 4 flashes and/or sounds in 10 seconds, for example 3 flashes and/or sounds.

A self-diagnostic test may be performed by the control module when the anti-entrapment device is first turned on, this usually occurs at the same time the engine of the MEWP is turned on. If the anti-entrapment device fails the diagnostic test, the control module is programmed to activate a fault warning system.

The fault warning system alerts the operator to the fact that the anti-entrapment device is either not working or fully functional so that the operator can take alternate precautions.

The fault warning system does not cut power to the controls meaning that the operator can chose to ignore the warning and operate the aerial lift without the anti-entrapment device being fully functional.

The anti-entrapment device must be restarted following activation of the switch activation device 43.

The basket/cage 20 may further comprise an information link to a data collection device and/or additional modules can be plugged into the control module.

As is evident from the description above, the control module can be programmed to perform certain actions on receipt of a given signal. For example, on triggering of the switch activation device the control module will send a signal to deactivate or override the function enable device, to double check whether the signal worked to cut power to the controls and if not to send a second signal to the emergency switch. It will also activate the alarm. Similarly, if the reset button is activated within a given period of time the control module will reset the anti-entrapment device and allow the controls to be functional again.

FIGS. 3A-B

Figure 3A:
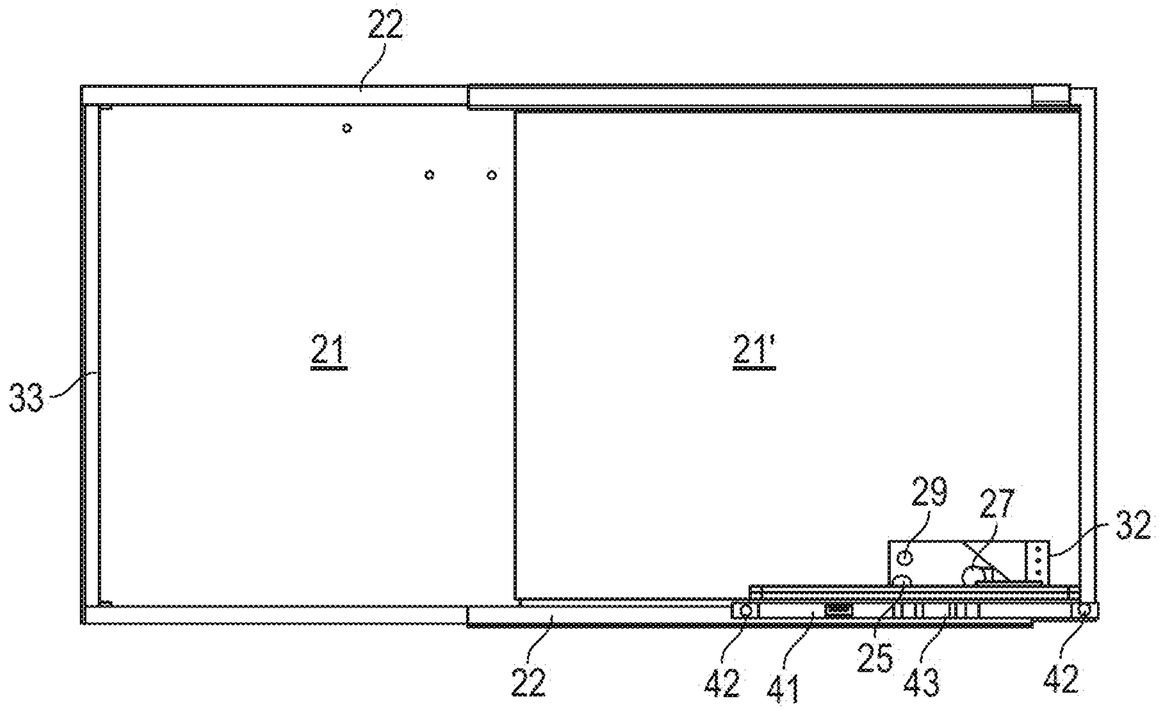
FIG. 3A shows a view from above of the basket/cage of FIG. 2 with the floor in a retracted configuration.
Figure 3B:
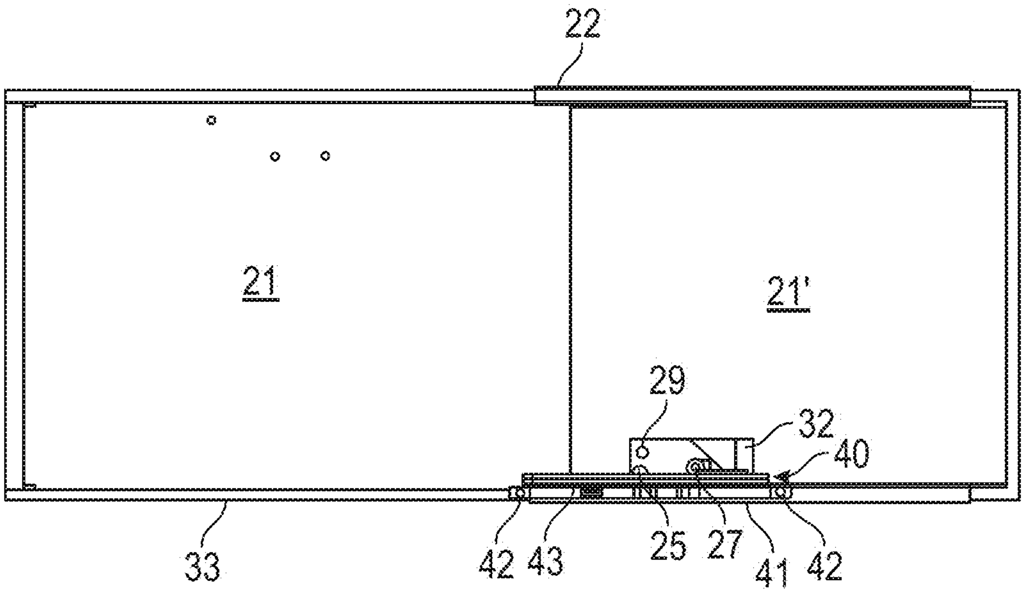
FIG. 3B shows a view from above of the basket/cage of FIG. 2 with the floor in an extended configuration.

With reference to FIGS. 3A and 3B there is shown a view of the scissor lift basket/cage 20 with the extendable floor 21,21' in a retracted configuration (FIG. 3A) and an extended configuration (FIG. 3B).

The control box may stay with the fixed deck of the scissor lift or may move with the sliding deck of the scissor lift as the floor is extended depending on the configuration of the basket/cage.

The configuration shown in FIGS. 3A and 3B is one wherein the control box stays with the fixed deck.

Figure 4A:
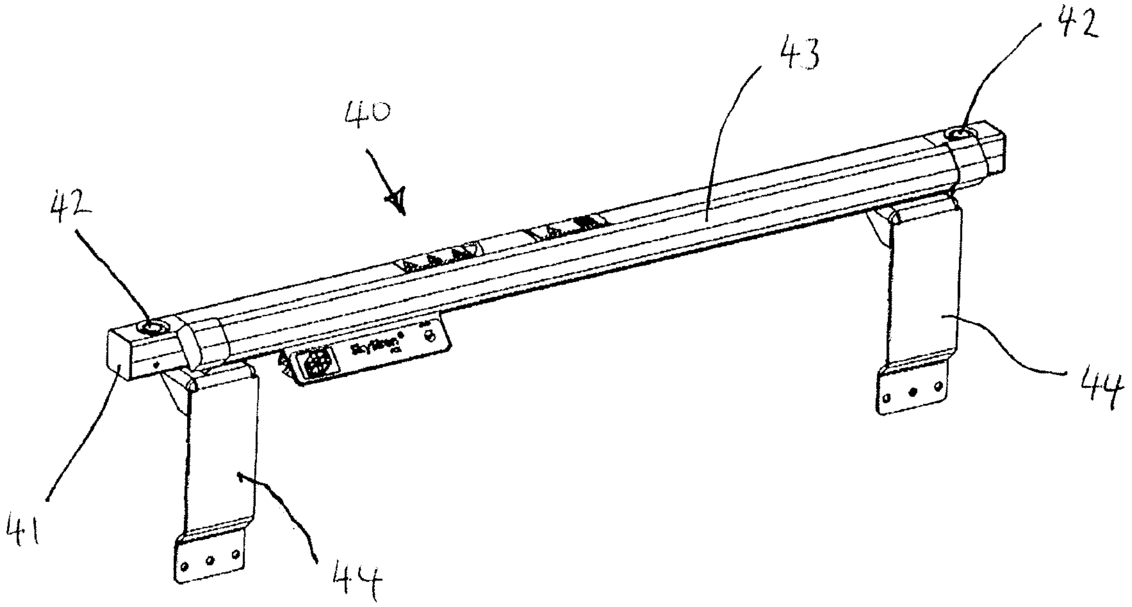
FIG. 4A shows an isometric view of an embodiment of an anti-entrapment device in accordance with the invention.
Figure 4B:
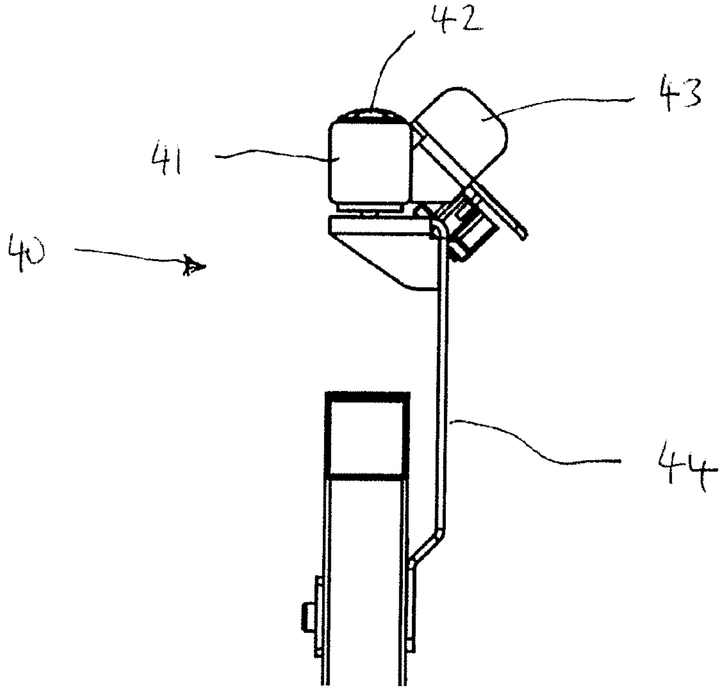
FIG. 4B shows a side view of the anti-entrapment device of FIG. 4A.
Figure 5A:
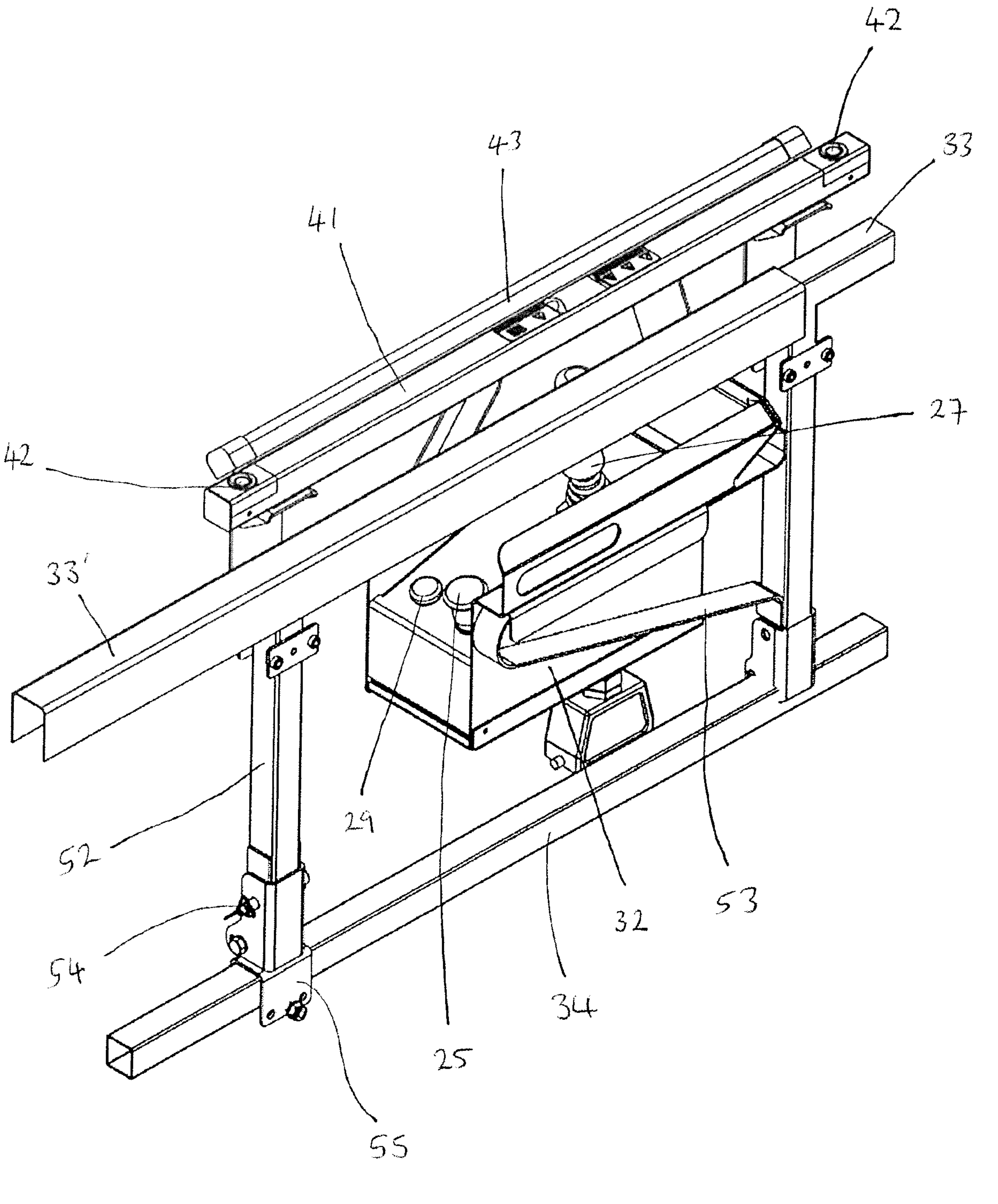
FIG. 5A shows an isometric view of a section of a basket/cage having the anti-entrapment device of FIG. 4A installed thereon from the outside of the basket or cage.
Figure 5B:
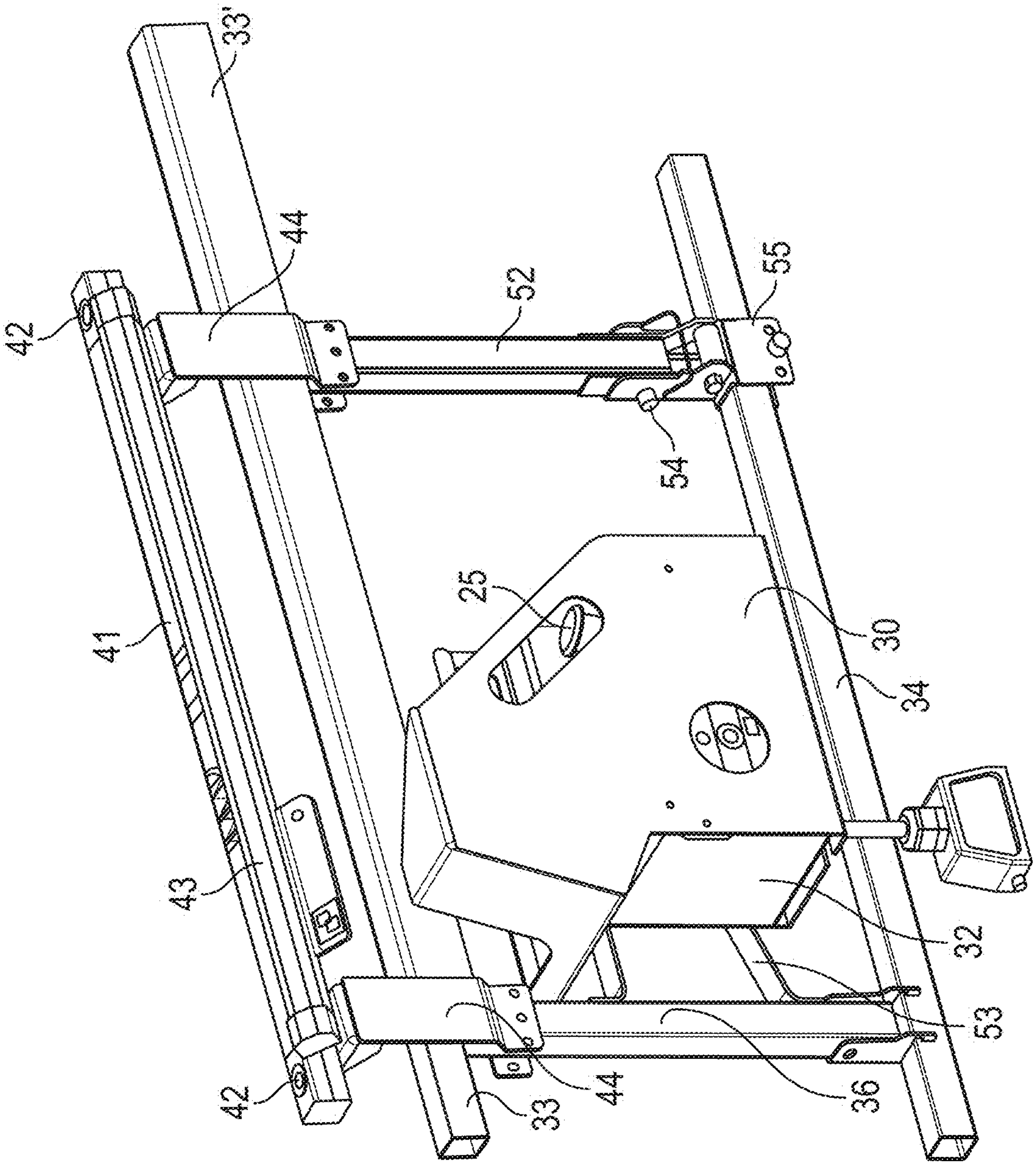
FIG. 5B shows an isometric view of a section of a basket/cage having the anti-entrapment device of FIG. 4A installed thereon from the inside of the basket or cage.
Figure 5C:
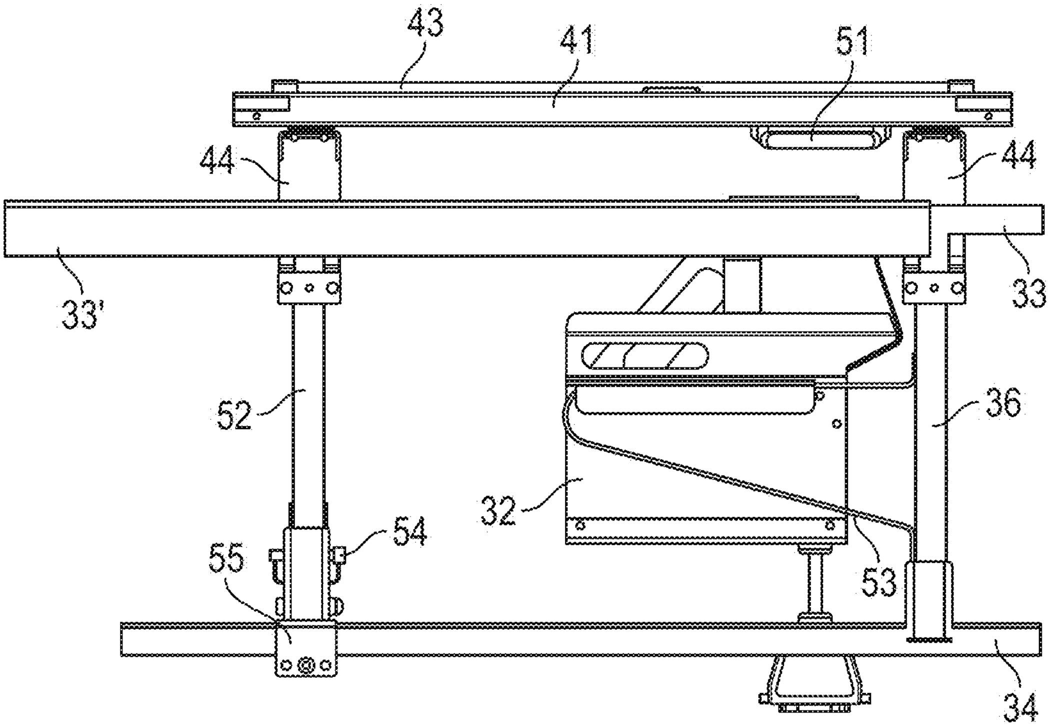
FIG. 5C shows a side view of the section of the basket/cage shown in FIG. 5A.
Figure 5D:
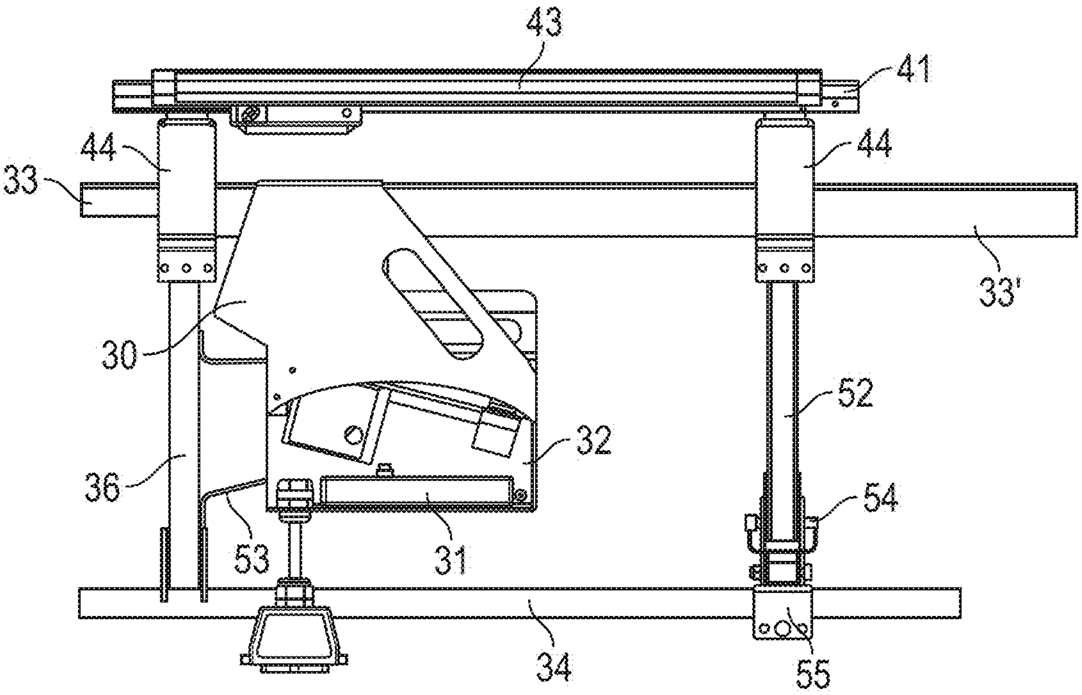
FIG. 5D shows a side view of the section of the basket/cage shown in FIG. 5B.

FIGS. 4A and 4B

With reference to FIGS. 4A and 4B, an embodiment of an anti-entrapment device 40 in accordance with the invention is shown.

In addition to the sensors 42 and the switch activate device 43, the anti-entrapment device 40 comprises an elongate housing 41 and an operator warning system.

The elongate housing 41 is between 50 cm and 100 cm in length. For example, the elongate housing is 75 cm in length.

The sensors 42 are housed in an elongate housing 41. In the embodiment shown, the anti-entrapment device 40 comprises two sensors 42. Each sensor is positioned proximate an end of the elongate housing 41.

In one configuration the sensors 42 are located at a distance of approximately 65 to 72 cm from each other such as 65, 66, 67, 68, 69, 70, 71 or 72 cm.

The detection zone defined by the sensors 42 is configured to detect obstacles within the detection zone. That is to say that the sensors are configured to facilitate the alerting of an operator standing in the basket/cage 20 to the presence of an obstacle that may potentially strike the operator before the strike occurs. The detection zone will be described in more detail later on.

The sensors do not detect the position of the operator inside the basket or cage. Advantageously, this permits the operator to undertake normal control of the basket or cage without triggering the sensors.

In addition, the number and positioning of the sensors mean that collision of an obstacle with the majority of the basket/cage 20 in not preventable i.e. the anti-entrapment device cannot work as a viable anti-collision device.

In a preferred configuration, the sensors 42 are ultrasonic sensors having a frequency of 39 to 41 kHz. However, it would be understood that the sensors may be any suitable sensors such as proximity sensors including, but are not limited to Doppler radar, passive infrared, motion detectors, capacitive, capacitive displacement, eddy-current, inductive, laser rangefinder, light beam or curtain, magnetic, passive optical, passive thermal infrared, photocell, Doppler effect, radar, reflection of ionising radiation, sonar and ultrasonic sensors. In addition, the frequency range of the sensors may be different to the one mentioned above.

An advantage of proximity sensors is that they typically have a high reliability and long functional life because of the absence of mechanical parts and lack of physical contact between sensor and the sensed object.

The maximum distance that a sensor can detect is defined as its "nominal range". Some sensors have adjustments of the nominal range or means to report a graduated detection distance.

In a preferred configuration, hysteresis of the sensors is set to approximately 1 to 15 cm increments, such as 2, 3, 4, 5, 6, 7, 8, 9, 10, 11, 12, 13, or 14 cm, for example approximately 5 cm increments. That is, a detected obstacle 100 cm away will be detected at 95 cm away, 90 cm away etc when moving toward it and will also be detected up to 105 cm away when moving away from it. Hysteresis is a term relating to sensors which indicates the sensor's response to objects that are getting closer as opposed to those which are moving away from the sensor.

In a preferred configuration, the sensors 42 detect obstacles approximately every 20 to 60 ms (milliseconds), such as 25, 30, 35, 40 45, 50 or 55 ms. For example every 40 ms.

In one configuration the debounce of the sensors 42 can detect obstacles in 1 to 15 consecutive detections, such as 2, 3, 4, 5, 6, 7, 8, 9, 10, 11, 12, 13, or 14 detections. For example 2 consecutive detections. De-bounce is a term relating to sensors which indicates the number of signals detected by the sensor before an event output is passed on.

The debounce of the sensors 42 are arranged to have a slightly different behaviour when the sensors 42 are moving closer to an object than when the sensors 42 are moving away from an object.

In one configuration the operator warning system is activated following two consecutive detection signals from a single sensor 42.

The operator warning system may be a visual, audible or tactile warning system. For example, lights, sounds or vibrations.

In an exemplary configuration, the operator warning system comprises one or more warning lights. The one or more warning lights are arranged on the elongate housing 41 and are configured to indicate whether one of the sensors has detected an obstacle. The one or more warning lights may also optionally indicate whether the sensors are functional.

The warning light(s) may have different colours to indicate different situations. For example, a green warning light to indicate that a respective sensor is functional, an amber warning light to indicate that an obstacle has entered the detection zone, and a red warning light to indicate that the anti-entrapment device is operating in override mode.

The switch activation device 43 is coupled to the elongate housing 21 and arranged at an angle to the orientation of the sensors (see FIG. 4B).

The switch activation device 43 is in the form of a pressure sensitive safety edge. A safety edge can be classified as a "trip" device. In general a safety edge or safety bumper is particularly suitable for use on machines which stop immediately after removal of power. A typical safety edge consists of an aluminium rail, a safety contact, and a safety contact strip. The special shape of the safety edge (rubber profile) protects the safety contact strip from damage.

A protective covering or sleeve may be provided over the switch activation device 43 and the elongate housing 41 to prevent unwanted tampering with the switch activation device 43. Such an arrangement is depicted in FIG. 2.

FIGS. 5A to 5D

With reference to FIGS. 5A to 5D, the mounting of the anti-entrapment device 40 of FIGS. 4A and 4B on the basket/cage 20 will now be described.

The control box of a scissor lift may be portable allowing its use in various different locations within the basket/cage or be fixed in a permanent location within the basket or cage.

In arrangements where the control box of the basket/cage is portable the basket/cage is provided with a mounting bracket on which the control box may be mounted. This defines the home position for the control box. The mounting bracket is generally fixed to a vertical rail of the basket/cage.

While the mounting of the anti-entrapment device 40 will be described with reference to a basket/cage having a portable control box, it would be understood that it not limited thereto and can be mounted in a basket/cage having a fixed control box position.

The mounting bracket for the control box 32 of the basket/cage 20 is indicated by the reference numeral 53 in FIGS. 5A to 5D. The same numerals as in the previously described figures are use to identify identical components.

The anti-entrapment device 40 is positioned proximate the home position of the control box 32. The location of the anti-entrapment device 40 is such that it is not easily unnecessarily triggered by an operator in the basket/cage.

The anti-entrapment device 40 comprises a pair of braces 44 configured to support the elongate housing 41 in a position above and parallel to the top rail 33 of the basket/cage. While two braces are shown being ustilised to support the elongate housing 41, it would be understood that more than to braces may be used or a different support arrangement employed.

Positioning the anti-entrapment device 40 proximate the home position means that it would be near the operator in situations where an entrapment/crush incident is likely to take place when accidental lifting not driving of the scissor lift occurs.

The braces 41 are spaced apart from each other at a distance between 55 cm and 65 cm.

The braces 41 are configured to locate the elongate housing 41 at a distance of between 5 cm and 10 cm above the top rail 33. The chosen spacing between the elongated housing and the top rail may be varied dependent on requirements and may be greater or less than the distance specified above.

The braces 41 are sized and shaped such that they support the elongate housing 41 in such a way that it does not protrude either into or out of the basket/cage 20.

One of the braces 41 is connected to the vertical rail 36 on which the mounting bracket 53 is fixed. In the embodiment shown, the brace 41 is releasably connected to the vertical rail 36 by fasteners, such as nuts and bolts etc. It would be understood that the bracket could instead be permanently connected to or integrally formed with the vertical rail.

The second brace 41 is connected to a second vertical rail 52. The brace 41 may be releasably or permanently connected to the second vertical rail 52, or be integrally formed with the second vertical rail 52.

The second vertical rail 52 may be retrofitted to the basket/cage or be pre-installed on the basket/cage.

In the embodiment shown, the second vertical rail 52 is retrofitted to the basket/cage 20 and is releasably connected to the mid rail 34 of the basket/cage 20. A clamp 55 is used to connect the second vertical rail 53 to the basket/cage 20.

The clamp is shown as releasably connected to the mid rail 34, although it would be understood that it may be permanently connected to the mid rail 34.

The braces 41 are shaped and positioned so as not to interfere with a sliding top rail 33' of the basket/cage which moves during extension and contraction of the floor 21, 21' of the basket/cage 20.

In the embodiment shown, the second vertical rail 52 is pivotly mounted to the clamp 55 via a pivot pin 54. In this way, the second vertical rail 52 will not prevent the handrails of the basket/cage 20 from collapsing in a manner known in the art.

The anti-entrapment device is connected to the control module 31 via any suitable means. For example, the connection may be via a physical link such as wiring or via a wireless connection.

FIG. 6

Figure 6:
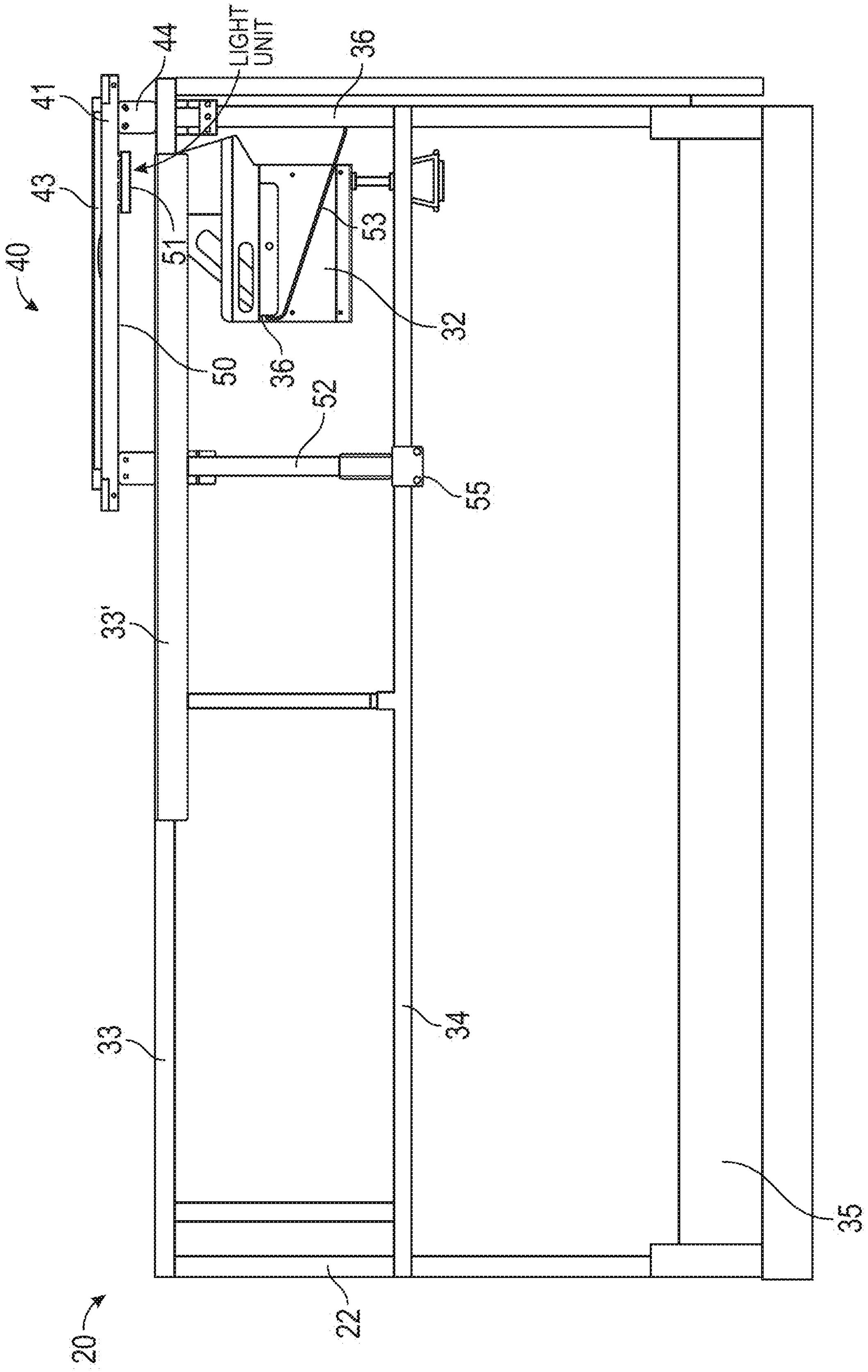
FIG. 6 shows a side view of the embodiment of the basket/cage in accordance with the invention.

With reference to FIG. 6 there is shown a view of the scissor lift basket/cage 20 from a side. In the embodiment shown, the alarm 51 is mounted to an underside 50 of the elongate housing 41. It would be understood that the alarm may be positioned in a different location.

In the embodiment shown, the alarm is in the form of a visual alarm. The alarm may instead be an audible alarm or a combined audible and visual alarm system.

The visual alarm, the visual alarm will flash when active since it is known that a non-flashing alarm is less likely to attract attention. The alarm will flash for a period of time when the switch activation device is activated.

Generally visual alarms will be at least 50 lumens, such as approximately 60, 70, 80, 90, 100, 110, 120, 130, 140, 150, 160, 170, 180, 190, 200, 210, 220 230, 240, 250, 260 or 270 lumens, for example over 230 lumens, such as about 240 lumens.

The flashing sequence of the visual alarm can be in a regular or irregular pattern or can be arranged to send a message such as a Morse code SOS.

In certain arrangements, an audible alarm is utilized in addition to or instead of the visual alarm 51. Generally the audible alarm will be at least 95 decibels, for example at least 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129 or 130 decibels, such as approximately 105 decibels.

The audible alarm may be in the form of a horn, for example a vehicle horn.

Where the scissor lift is provided with a vehicle horn, the audible alarm may utilise the horn so as to avoid the requirement of installing a separate horn.

The audible alarm is linked to the vehicle horn via a serial communications link, such as an RS232 lead.

Alternatively, a separate horn may be installed on the basket/cage 20 as part of the combined audible and visual alarm system.

The alarm or horn sounds a unique sounding pattern, for example as Morse code SOS pattern—that is 3 short alarms followed by three long alarms followed by three short alarms to replicate the . . . - - - . . . of Morse code.

The audible or visual SOS alarm preferably has a duration of 30 seconds or less, for example 29, 28, 27, 26, 25, 24, 23, 22, 21, 20, 19, 18, 17, 16, 15, 14, 13, 12, 11, 10, 9, 8, 7, 6, 5, 4, 3, 2 or 1 second. In an exemplary arrangement, the SOS alarm has duration 10 seconds.

Figure 7A:
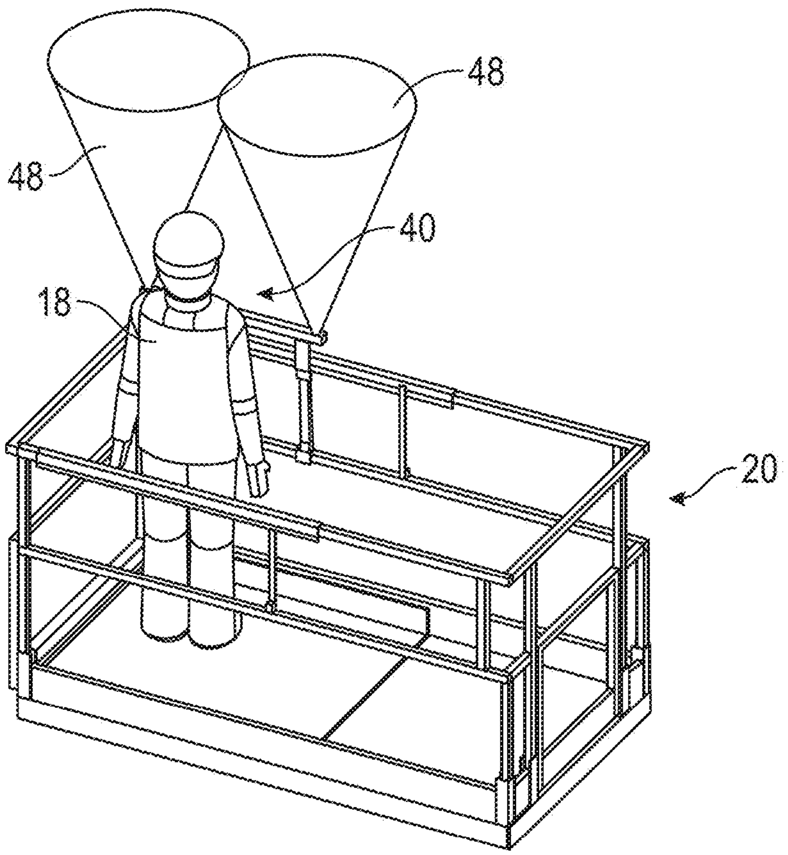
FIG. 7A shows an isometric view of a basket or cage having an anti-entrapment device in accordance with the invention highlighting schematically the detection zone provided by each sensor of the anti-entrapment device.
Figure 7B:
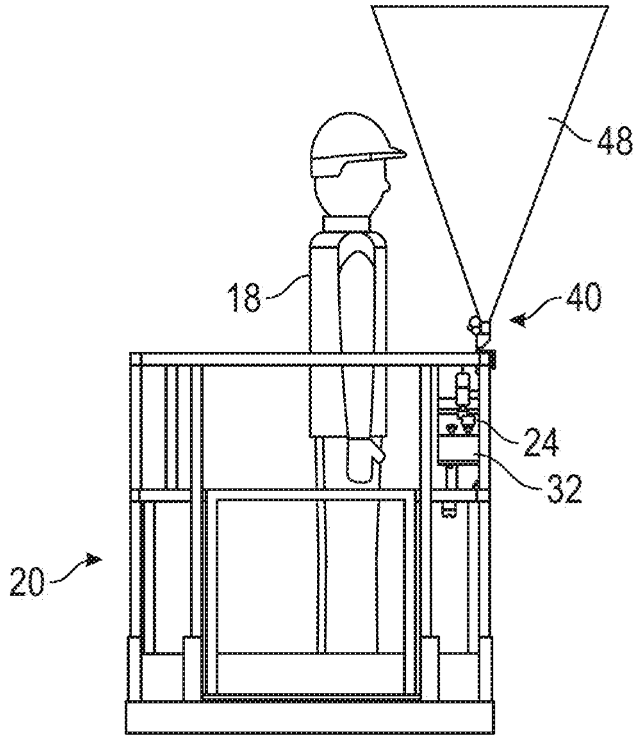
FIG. 7B shows a side view of the basket or cage of FIG. 7A, highlighting the detection zone above the operator's head.

FIGS. 7A and 7B

With reference to FIGS. 7A and 7B there is shown the basket/cage 20 with an operator 18 stood therein in front of the control panel 24. The detection zone 48 is indicated generally, the detection zone 48 being created by the two sensors 42 mounted on the elongate housing (see earlier figures).

The sensors 42 each detect a conical shaped area which is larger the further away from the sensor. While not shown in the figures, the conical detection area of two or more sensors may overlap closer or further away from the sensors.

Typically the detection zone 48 is arranged to detect obstacles that come within 1 metre above the operator's head.

For example, if the operator is assumed to be 180 cm tall, in one configuration the detection zone detects obstacles that are within 300 mm of the operator's head when standing in the basket/cage. Therefore the detection zone is arranged to detect obstacles approximately 210 cm (2100 mm) above the floor of the basket/cage.

In one configuration the sensors detect up to 80% of the detection zone.

The sensors will have a detection angle of approximately 30 to 50 degrees, such as 31, 32, 33, 34, 35, 36, 37, 38, 39, 40, 41, 42, 43, 44, 45, 46, 47, 48 or 49 degrees. For example approximately 40 degrees.

In one configuration, the conical detection area has a diameter of approximately 550 to 600 mm at 800 mm away, such as 555, 560, 565, 570, 575, 580, 585, 590 or 595 mm. For example approximately 582 mm at 800 mm away.

In another configuration, the conical detection area has a diameter of approximately 625 to 675 mm at 900 mm away, such as 630, 635, 640, 645, 650, 655, 660, 665 or 670 mm. For example approximately 655 mm at 900 mm away.

In yet another configuration, the conical detection area has a diameter of approximately 700 to 750 mm at 1000 mm away, such as 705, 710, 715, 720, 725, 730, 735, 740 or 745 mm. For example approximately 728 mm at 1000 mm away.

In yet another further configuration, embodiment the conical detection area has a diameter of approximately 250 to 300 mm at 400 mm away, such as 255, 260, 265, 270, 275, 280, 285, 290 or 295 mm. For example approximately 291 mm at 400 mm away.

The sensor range of the sensors 42 can be adjusted and is set so that it does not detect obstacles too far away such that it provides false readings thus leading to an operator not believing in the system and thereby potentially ignoring real risk situations.

In addition, the features of sensor detection envelop i.e. angle, height, diameter etc., can be adjusted as required.

FIG. 8

Figure 8:
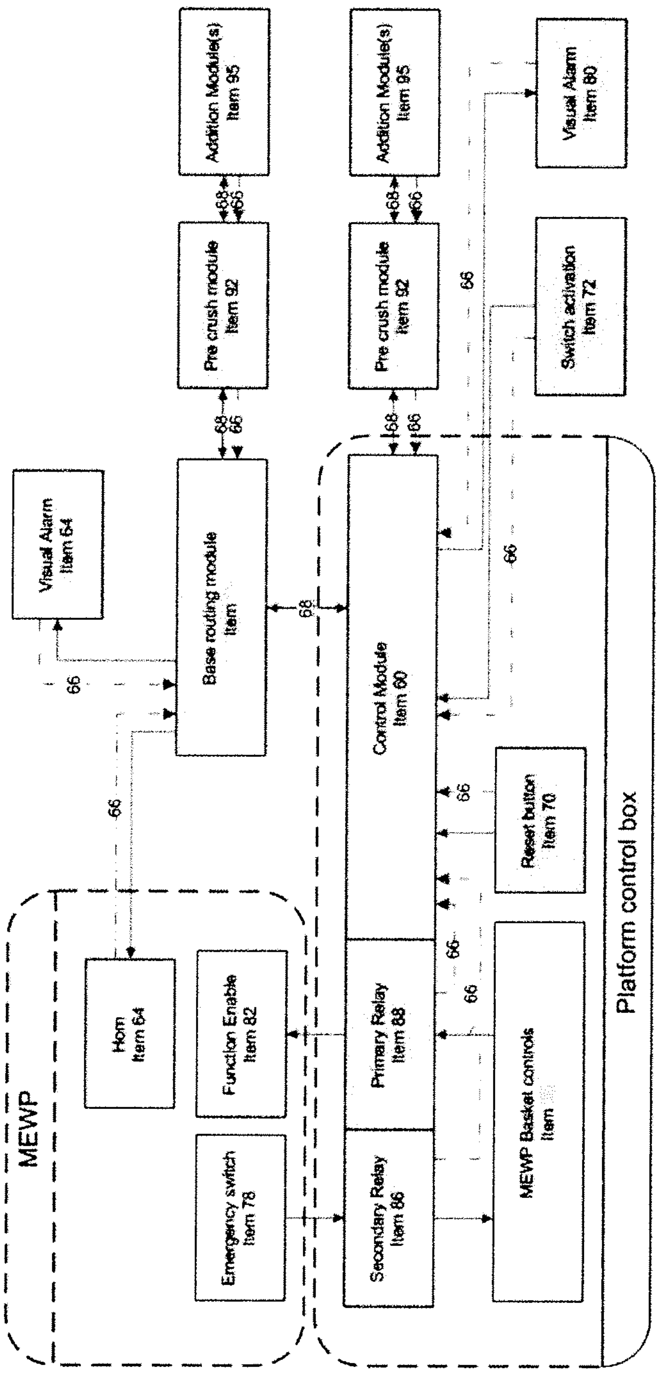
FIG. 8 shows a block type circuit diagram for connection of the anti-entrapment device into safety switches of the aerial lift.

With reference to FIG. 8 there is shown a simplified circuit diagram for the anti-entrapment device.

In use, the anti-entrapment device is turned on when the MEWP is powered up and performs a self-diagnostic test via the control module 60. If the self-diagnostic test is failed the operator is alerted by means of an alarm. If the test is passed the anti-entrapment device is functional.

When the aerial lift is operational the operator activates the function enable switch 82 which signals to the control module 60 to monitor for entrapment events. If an entrapment event is detected by the switch activation device 72, a signal is sent to the control module 60 to tell it to cut power to the function enable switch 82 via a primary relay 88.

If the primary relay cannot cut power to the function enable switch a signal is sent via the control module to a secondary relay 86 which cuts the power at the emergency switch 78.

In addition, when an entrapment event is detected by the activation of the switch activation device 72, a further signal from the control module is sent to activate the alarms 64, 80 within the basket (i.e. under the elongate housing) and at ground level. The ground level alarm is activated via communications with a ground level routing module 62.

The control panel features a reset button 70 which communicates with the control module 60 to reset the alarms following accidental triggering of the switch activation device. For example, if pressed within 10 seconds of the triggering.

At each stage, error checking and fault reporting protocols 66 are in place to alert the operator that the anti-entrapment device is not functional.

In the event that the function enable switch 82 is not activated, the switch activation device 72 is ignored.

Additional anti-entrapment devices 92*a* (labeled as Pre crush modules in FIG. 8) or additional modules 95 can be connected to the control module, or the Base routing module 62, if desired.

In one embodiment the operator can override the anti-entrapment device 92 by activating an override procedure.

In one embodiment the override procedure comprises pressing an override button.

In one embodiment the override button is mounted on the control panel.

In one embodiment the override button is mounted on the elongate housing.

In one embodiment the override is automatically reset into detection mode if the detection zone is clear of obstacles. That is, if an obstacle is detected and the operator overrides the anti-entrapment device, then the operator moves out of the detection zone, the system is reset ready to detect the next obstacle.

The present invention provides an improved method of preventing the crushing of an operator standing in a basket or cage of an aerial lift by an obstacle striking said operator. This is because the present invention involves both installing a plurality of sensors to the basket or cage to establish a detection zone and installing a switch activation device proximate a control box of said aerial lift, and connecting the sensors and the switch activation device to a control module capable of preventing movement of the basket or cage and/or alerting the operator to the presence of an obstacle.

In this way, the operator is notified of obstacles which may strike the operator and if an obstacle should strike the operator resulting in an entrapment event further movement of the basket/cage which would result in crushing of the operator is prevented.

Continuously monitoring the detection zone for an obstacle entering the detection zone means that the operator is alerted of potentially hazardous situations while operating the aerial lift.

Signals sent from the sensors to the control module would instruct the control module to alert the operator of the presence of an obstacle within the detection zone and to prevent movement of the basket or cage when the obstacle is detected in a predetermined range from the sensors.

Where the signal from the sensors results the control module preventing movement of the basket or cage, a dwell time before reactivation of the sensors may be employed after reactivation of the controls in order to prevent an operator getting stranded due the obstacle being in intermittently in the detection zone while trying to move the basket/cage.

Movement of the basket or cage is stopped on activation of the switch activation device. Reactivation of the controls would only allow movement of the basket/cage in a downwards direction. The control module may be programmed after activation of the switch activation device to stop movement of the basket/cage in an upwards direction (i.e. lifting) and immediately cause the basket/cage to be lowered a predetermined distance or for a period of time at a slow speed.

While the invention has been described with use of a single anti-entrapment device fitted to the basket/cage, two or more anti-entrapments devices as hereinbefore described may be used with the basket/cage. In such a situation, the anti-entrapment devices are positioned and connected in series with one another.

In the context of the present disclosure, anti-entrapment device means a device for preventing or limiting the severity of entrapment events. That is, an accident in which an operator is struck by an object causing him to be pressed against the switch activation device in a potential crushing position.

As employed herein aerial lift refers to any form of powered extendable lift for enabling an operative to work at height, such as a MIEWP, cherry picker or scissor lift. Aerial lift does not include a forklift truck or manually-powered (i.e. non-electrical) lifts.

Basket or cage as employed herein refers to a working platform with a safety barrier. The basket or cage is typically not enclosed overhead.

Controls as employed herein refers to the entirety of the controls via which the operator can manoeuvre the basket or cage including the control lever on the control panel and the function enable switch.

Emergency switch as employed herein refers to a switch or button which, when activated, cuts all power to the MEWP platform controls, overriding all other controls and preventing further movement of the basket or cage.

Allows the flow of electricity as employed herein refers to a closed (complete) circuit wherein electricity is free to move, completing the circuit and allowing power to be supplied to the controls of the basket or cage. That is, the controls of the basket or cage are "live" and can be used to manoeuvre the basket or cage.

Stop (or cut) electrical supply as employed herein means that the circuit is open (broken), power is not supplied to the controls of the basket or cage and therefore the basket or cage cannot be moved.

Prevent movement as employed herein means that the basket or cage cannot be maneuvered. Typically this is due to the controls not receiving power either because the function enable switch is not activated or because the emergency switch has been activated.

Function enable switch as employed herein means a switch which must be activated for the controls to be live or functional. For example, a dead man's handle must be held closed or a foot switch must be depressed.

Dead man's handle as employed herein refers to a switch, generally a lever, which acts as a safety device by shutting off power when not held in place (held closed) by the operator.

Held closed by the operator as employed here refers to any function enable switch which is held in the closed position, that is, the position which enables the flow of electricity. Examples include, but are not limited to, a dead man's handle which is held in the active position and a foot switch which is depressed.

Alarm as employed herein refers to any alerting system designed to draw attention to a specific problem or danger. Alarms can be visual, audible, tactile (e.g. such as vibration alert) or any other type of alarm.

Audible as employed herein refers to an alarm which can be heard, for example, a klaxon or horn.

Horn as employed herein is a sound-making device used to warn others of a hazard, such as the approach of a vehicle or of its presence. Automobiles, trucks, ships, and trains are generally required by law to have horns.

Unique sounding pattern as employed herein refers to a specific repeated activation of the alarm, for example is a Morse code SOS pattern—that is 3 short alarms followed by three long alarms followed by three short alarms to replicate the . . . - - - . . . of Morse code.

RS232 as employed herein refers to a standard for serial communication transmission of data. It formally defines the signals connecting between a DTE (data terminal equipment) such as a computer terminal, and a DCE (data circuit-terminating equipment, originally defined as data communication equipment), such as a modem. The RS-232 standard is commonly used in computer serial ports. The standard defines the electrical characteristics and timing of signals, the meaning of signals, and the physical size and pinout of connectors.

Visual as employed herein refers to alarm which can be seen, such as a light or beacon.

Flashes as employed herein means repeatedly turning on and off. This can be in a regular or irregular pattern or can be arranged to send a message such as a Morse code SOS.

Underside as employed herein means the bottom or underneath. In use, the underside can be seen from the ground when the basket or cage is elevated.

Switch activation device as employed herein refers to a switch that activates, that is, triggers, the anti-entrapment device to be deployed. While the invention has been described with reference to a switch activation device in the form of a pressure sensitive safety edge, it would be understood that it is not limited thereto. Other types of switch activation device may be utilized, including, but not limited to a tensioned cord or wire, a safety bar, a laser or other beam or curtain of light which is activated when the beam is broken.

Pressure sensitive safety edge as employed herein refers to a sensor, which may be offered as a normally open contact. Safety edges are typically flexible. If the moving part that includes the safety edge or safety bumper strikes an operator (or vice versa) the flexible safety edge is depressed under the applied load and will send a signal for movement to be stopped.

Brace as employed herein refers to a mechanical fastening arranged to hold the anti-entrapment device in position.

Proximate to as employed herein means very close to.

Reset switch as employed herein is a switch or button which can be used to override the activity of the safety activation device and ignore an accidental activation of the device.

Primary relay connected to the function enable switch as employed herein means an electrically operated switch that electrically connects the control module and the function enable switch. It would be understood that an alternative connection means that is capable of sending an electrical signal between the control module and the function enable switch may be utilized. Generally, the signal will be a signal to deactivate or override the function enable switch, that is, to cut electrical supply and prevent movement of the basket or cage.

Secondary relay connected to the emergency switch as employed herein means an electrically operated switch that electrically connects the control module and the emergency switch. It would be understood that an alternative a connection means that is capable of sending a signal between the control module and the emergency switch may be utilized. Generally, the signal will be a signal to activate the emergency switch, that is, to cut electrical supply and prevent movement of the basket or cage.

Control module as employed herein refers to a component of the anti-entrapment device which controls the interactions between components.

Self-diagnostic as employed herein means the process of diagnosing, or identifying the status of each component in the anti-entrapment device. Typically the process involves checking that power is supplied to each component, and where possible that the component is working.

Warning system as employed herein means a different alarm pattern to the emergency alarm seen or heard when the anti-entrapment device is triggered by the switch activation device.

Delay activation as employed herein refers to a delay between receiving the activation signal from the switch activation device and sending the signal to deactivate the function enable switch.

Housed within as employed herein means that the control module is arranged to have suitable dimensions that is can fit entirely within the control box of the aerial lift.

Additional modules as employed herein refers to modular units that can be connected to the present anti-entrapment device to extend or improve its usefulness. Such modules include, but are not limited to, additional sensors and data collection devices.

Plugged into the control module as employed herein refers to the intention that such module will be easily connectable by the unskilled person or a person with minimal training.

Communication link as employed herein refers to the transmission of data from the control module to another module (including the data collection device). Any suitable means of transmission is intended to be covered including physical cabling, such as ethernet, or wireless transmission including radio, wifi and Bluetooth etc.

Data collection device as employed herein refers to a "black box" type recorder intended to record information about collisions and entrapments or near collisions/entrapments, operator data, results of the self-diagnostic test among other things.

In the context of this specification "comprising" is to be interpreted as "including".

Aspects of the disclosure comprising certain elements are also intended to extend to alternative embodiments "consisting" or "consisting essentially" of the relevant elements.

Where technically appropriate, embodiments of the invention may be combined.

Embodiments are described herein as comprising certain features/elements. The disclosure also extends to separate embodiments consisting or consisting essentially of said features/elements.

Technical references such as patents and applications are incorporated herein by reference.

Any embodiments specifically and explicitly recited herein may form the basis of a disclaimer either alone or in combination with one or more further embodiments.

Sensors as employed herein means a device that detects a change in events. In the present context the event to be detected is the presence of an obstacle.

Ultrasonic as employed herein means sound at a frequency above the audible limit of human hearing, that is, above 20,000 Hz.

Upward facing as employed herein means the sensors point substantially perpendicular to the ground or to the surface on which the sensors are mounted. That is, the sensors are vertical.

Does not protrude either into or out of the basket or cage as employed herein means that it is dimensioned such that it is neither taller nor wider than the surface on which it is mounted.

Removably attachable as employed herein means that the anti-entrapment device can be attached to the aerial lift temporarily. Advantageously this means that the anti-entrapment device can be fitted or removed from the lift as desired.

Detection zone as employed herein refers to the totality of all of the sensors sensing capacity.

Obstacle as employed herein means an object substantially large and solid enough to be detected by the sensors as a danger to the operator.

Strike as employed herein means to hit and potentially injure the operator.

Operator as employed herein means a man or woman standing in the basket or cage of the aerial lift, typically standing in front of the control panel.

Operator warning system as employed herein means a system designed to alert the operator of various factors, including but not limited to, an obstacle has entered the detection zone, the anti-entrapment device is running in override mode.

Fault warning system as employed herein means a system designed to alert the operator of a fault with the anti-entrapment device.

Warning lights as employed herein means one or more lights that can show different states, for example different flash patterns or different colours.

Alert the operator to the presence of the obstacle as employed herein means that a visual audible or tactile warning is transmitted to the operator to indicate that an obstacle has entered the detection zone.

Prevent movement as employed herein means that the basket or cage cannot be maneuvered. Typically this is due to the controls not receiving power either because the function enable switch is not activated or because the emergency switch has been activated.

Override as employed herein means that the operator can choose to continue to work with an obstacle inside the detection zone. Advantageously this permits the operator to work on an obstacle if desired. For example, if the basket/cage needs to be within a shorter distance to an obstacle than the sensors would allow before activating the control module to stop movement of the basket/cage.

The invention claimed is:

1. An anti-entrapment device for a scissor lift having a basket or cage, comprising:
- an elongate housing, the elongate housing having a length between 50 cm and 100 cm;
- at least two sensors housed within the elongate housing, each sensor being positioned proximate an end of the elongate housing;
- a switch activation device coupled to the elongate housing and extending along the length of the elongate housing between the at least two sensors, said switch activation device comprising a pressure sensitive safety edge being arranged at an angle of approximately 45 degrees to the orientation of at least one of said at least two sensors within said elongate housing,
- wherein the said at least two sensors are arranged to provide a detection zone and to detect obstacles within the detection zone, the at least two sensors configured to facilitate alerting an operator standing in said basket or cage to the presence of an obstacle of the obstacles that may strike the operator before the strike occurs,
- wherein the switch activation device is configured to prevent movement of the basket or cage upon activation of the switch activation device, the switch activation device being configured to be activated by striking or by being struck by said operator standing in said basket or cage.

2. The anti-entrapment device of claim 1, further comprising a plurality of braces configured to support the elongate housing in a position above and parallel to a top rail of the basket or cage.

3. The anti-entrapment device of claim 1, further comprising an operator warning system.

4. The anti-entrapment device according to claim 1, wherein the at least two sensors are ultrasonic sensors.

5. A basket or cage for a scissor lift, said basket or cage comprising:
- an anti-entrapment device, comprising:
  - an elongate housing, the elongate housing having a length between 50 cm and 100 cm;
  - at least two sensors housed within the elongate housing, each sensor being positioned proximate an end of the elongate housing;
  - a switch activation device coupled to the elongate housing and extending along the length of the elongate housing between the at least two sensors, said switch activation device comprising a pressure sensitive safety edge being arranged at an angle of approximately 45 degrees to the orientation of at least one of said at least two sensors within said elongate housing,
  - wherein the said at least two sensors are arranged to provide a detection zone and to detect obstacles within the detection zone, the at least two sensors configured to facilitate alerting an operator standing in said basket or cage to the presence of an obstacle of the obstacles that may strike the operator before the strike occurs,
  - wherein the switch activation device is configured to prevent movement of the basket or cage upon activation of the switch activation device, the switch activation device being configured to be activated by striking or by being struck by said operator standing in said basket or cage, and
- controls which permit said operator standing in the basket or cage to maneuver said basket or cage, said controls comprising:
  - an emergency switch which normally allows a flow of electricity and is operable to stop electrical supply and prevent movement of the basket or cage, and
  - a function enable switch which is normally open to cut electrical supply and prevent movement of the basket or cage and which must be held closed by the operator to allow the flow of electricity and enable said operator to operate the controls;

an alarm which is either audible, visual or both audible and visual;

a primary relay connected to said function enable switch; and a secondary relay connected to said emergency switch;

said primary and secondary relays being controlled by a programmable control module connected to the switch activation device, the function enable switch and the alarm;

wherein said programmable control module is programmed to prevent movement of the basket or cage by cutting electrical supply to the function enable switch when the function enable switch is closed and the pressure sensitive safety edge is activated, and to activate the alarm.

6. A basket or cage for a scissor lift, said basket or cage comprising:

an anti-entrapment device, comprising:

an elongate housing, the elongate housing having a length between 50 cm and 100 cm;

at least two sensors housed within the elongate housing, each sensor being positioned proximate an end of the elongate housing;

a switch activation device coupled to the elongate housing and extending along the length of the elongate housing between the at least two sensors, said switch activation device comprising a pressure sensitive safety edge being arranged at an angle of approximately 45 degrees to the orientation of at least one of said at least two sensors within said elongate housing, wherein the said at least two sensors are arranged to provide a detection zone and to detect obstacles within the detection zone, the at least two sensors configured to facilitate alerting an operator standing in said basket or cage to the presence of an obstacle of the obstacles that may strike the operator before the strike occurs, wherein the switch activation device is configured to prevent movement of the basket or cage upon activation of the switch activation device, the switch activation device being configured to be activated by striking or by being struck by said operator standing in said basket or cage, wherein the anti-entrapment device is secured to a frame of the basket or cage such that said pressure sensitive safety edge is responsive to vertical forces acting down on it and to horizontal forces acting on it applied by said operator inside the basket or cage; and controls which permit an operator standing in the basket or cage to maneuver said basket or cage, said controls comprising:

an emergency switch which normally allows a flow of electricity and is operable to stop electrical supply and prevent movement of the basket or cage, and a function enable switch which is normally open to cut electrical supply and prevent movement of the basket or cage and which must be held closed by the operator to allow the flow of electricity and enable said operator to operate the controls;

an alarm which is either audible, visual or both audible and visual;

a primary relay connected to said function enable switch; and a secondary relay connected to said emergency switch;

said primary relay and said secondary relay being controlled by a programmable control module connected to the switch activation device, the function enable switch and the alarm;

wherein said programmable control module is programmed to prevent movement of the basket or cage by cutting electrical supply to the function enable switch when the function enable switch is closed and the switch activation device is activated, and to activate the alarm.

7. The basket or cage of claim 6, wherein if the electrical supply to the function enable switch cannot be cut, the programmable control module is further programmed to prevent movement of the basket or cage and activate the alarm by operating the emergency switch to cut the electrical supply.

8. The basket or cage according to claim 7, wherein the function enable switch is a dead man's handle.

9. The basket or cage according to claim 6, wherein the alarm is located on an underside of the elongate housing of the anti-entrapment device.

10. The basket or cage according to claim 6, wherein the scissor lift has a horn and the alarm is an audible alarm which utilizes the horn.

11. The basket or cage according to claim 10, wherein the alarm is linked to the horn via a communications link such as an RS232 interface.

12. The basket or cage according to claim 6, wherein the alarm is visual and flashes for a period of time when the switch activation device is activated.

13. The basket or cage according to claim 6, wherein the programmable control module is further programmed to perform a self-diagnostic test when the anti-entrapment device is first turned on, and if the anti-entrapment device fails the self-diagnostic test the programmable control module is programmed to activate a fault warning system.

14. The basket or cage according to claim 6, further comprising a switch activation device reset switch connected to the programmable control module.

15. The basket or cage according to claim 14, wherein the switch activation device reset switch is located on the controls of the basket or cage.

16. The basket or cage according to claim 6, wherein the programmable control module is further programmed to delay cutting the electrical supply to the function enable switch upon activation of the switch activation device.

17. The basket or cage according to claim 16, wherein the programmable control module delays for approximately 0.4 seconds.

18. The basket or cage according to claim 6, wherein additional modules can be plugged into the programmable control module.

19. The basket or cage according to claim 6, wherein the basket or cage has a scissor lift control box and the programmable control module is housed within said scissor lift control box.

20. The basket or cage according to claim 6, wherein the anti-entrapment device comprises one or more anti-entrapment devices and the anti-entrapment device is removably attached to the basket or cage.

21. The basket or cage according to claim 6, wherein the detection zone of the at least two sensors extends approximately 210 cm above a floor of the basket or cage.

22. The basket or cage according to claim 6, wherein the at least two sensors do not detect the position of the operator standing in the basket or cage.

23. The basket or cage according to claim 6, wherein the basket or cage is a scissor lift basket or cage.

24. The basket or cage according to claim 6, wherein the basket includes a top rail, the anti-entrapment device coupled to and extending above the top rail.

25. A scissor lift comprising a basket or cage, said basket or cage comprising:

an anti-entrapment device, comprising:

an elongate housing, the elongate housing having a length between 50 cm and 100 cm:

at least two sensors housed within the elongate housing, each sensor being positioned proximate an end of the elongate housing:

a switch activation device coupled to the elongate housing and extending along the length of the elongate housing between the at least two sensors, said switch activation device comprising a pressure sensitive safety edge being arranged at an angle of approximately 45 degrees to the orientation of at least one of said at least two sensors within said elongate housing, wherein the said at least two sensors are arranged to provide a detection zone and to detect obstacles within the detection zone, the at least two sensors configured to facilitate alerting an operator standing in said basket or cage to the presence of an obstacle of the obstacles that may strike the operator before the strike occurs, wherein the switch activation device is configured to prevent movement of the basket or cage upon activation of the switch activation device, the switch activation device being configured to be activated by striking or by being struck by said operator standing in said basket or cage, wherein the anti-entrapment device is secured to a frame of the basket or cage such that said pressure sensitive safety edge is responsive to vertical forces acting down on it and to horizontal forces acting on it applied by said operator inside the basket or cage; and controls which permit an operator standing in the basket or cage to maneuver said basket or cage, said controls comprising:

an emergency switch which normally allows a flow of electricity and is operable to stop electrical supply and prevent movement of the basket or cage, and a function enable switch which is normally open to cut electrical supply and prevent movement of the basket or cage and which must be held closed by the operator to allow the flow of electricity and enable said operator to operate the controls;

an alarm which is either audible, visual or both audible and visual:

a primary relay connected to said function enable switch; and a secondary relay connected to said emergency switch:

said primary relay and said secondary relay being controlled by a programmable control module connected to the switch activation device, the function enable switch and the alarm:

wherein said programmable control module is programmed to prevent movement of the basket or cage by cutting electrical supply to the function enable switch when the function enable switch is closed and the switch activation device is activated, and to activate the alarm.

26. An anti-entrapment device for an aerial lift having a basket or cage, the anti-entrapment device comprising:

an elongate housing, said elongate housing being between 50 cm and 100 cm in length;

at least two sensors housed within said elongate housing, each of said at least two sensors being positioned proximate an end of said elongate housing;

a switch activation device extending between the at least two sensors and coupled to the elongate housing, said switch activation device arranged at an angle of around 45 degrees to the orientation of said at least one of said at least two sensors within said elongate housing, said switch activation device comprising a pressure sensitive safety edge; and a plurality of braces configured to support the elongate housing in a position above and parallel to a top rail of said basket or cage such that the pressure sensitive safety edge is responsive to vertical forces acting down on it and to horizontal forces acting on it applied by an operator inside the basket or cage.

* * * * *